June 11, 1929.   T. R. BRUMFIELD   1,716,949
VEHICLE JACK
Filed Feb. 5, 1927   2 Sheets-Sheet 1
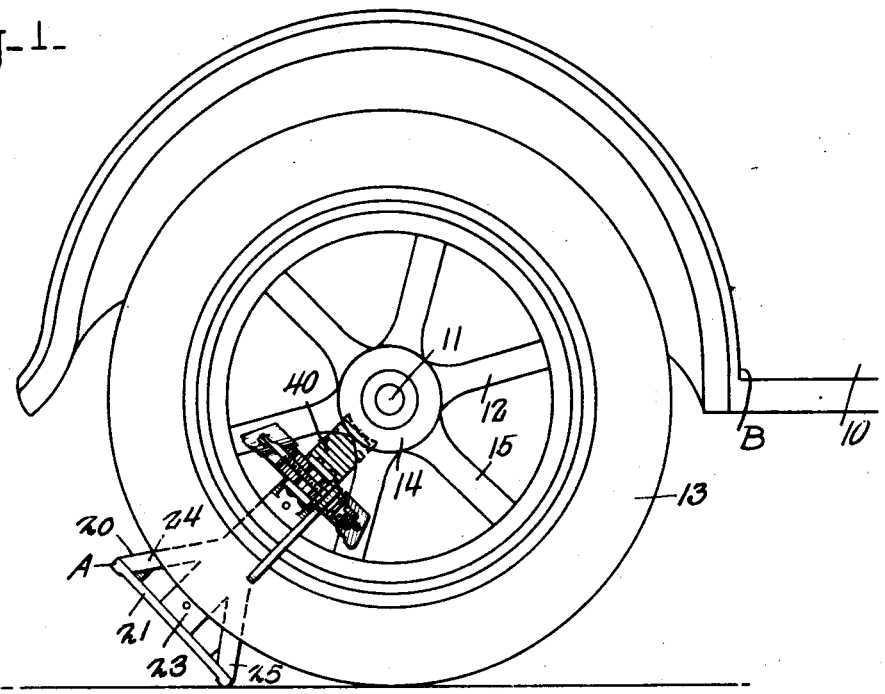
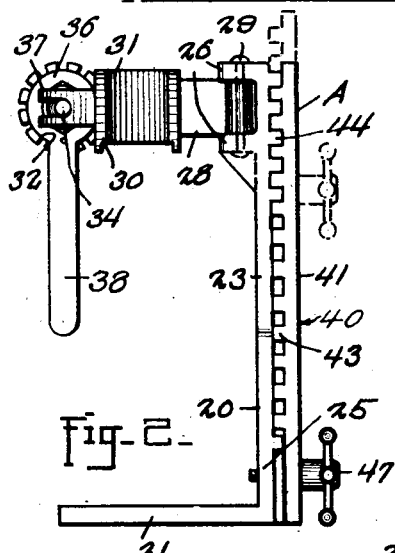
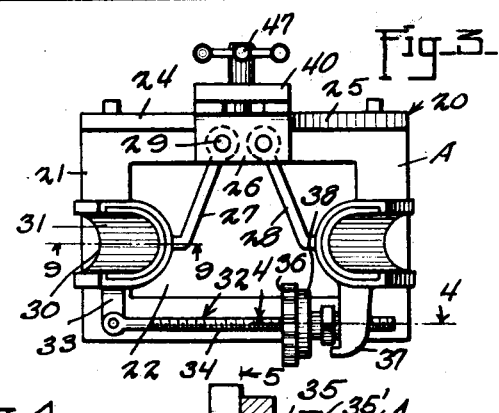
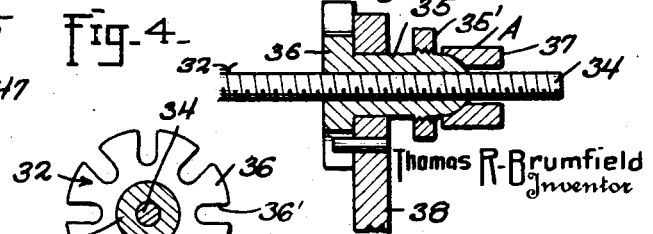
Thomas R. Brumfield
Inventor June 11, 1929.　　　T. R. BRUMFIELD　　　1,716,949
VEHICLE JACK
Filed Feb. 5, 1927　　　2 Sheets-Sheet 2
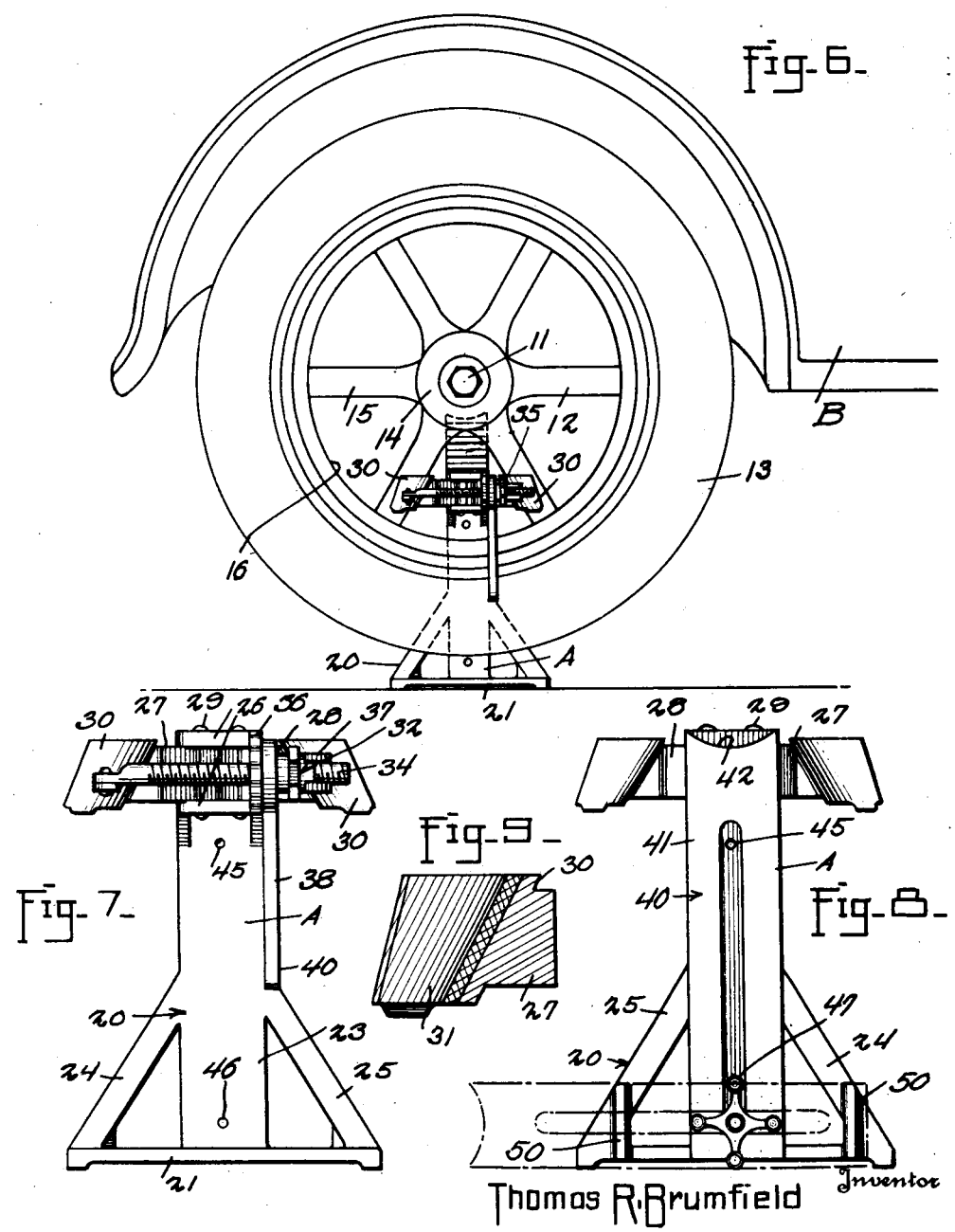

Patented June 11, 1929.

1,716,949

UNITED STATES PATENT OFFICE.

THOMAS R. BRUMFIELD, OF DANVILLE, VIRGINIA, ASSIGNOR TO POSIE L. HINES, OF DANVILLE, VIRGINIA.

VEHICLE JACK.

Application filed February 5, 1927. Serial No. 166,233.

This invention appertains to new and useful improvements in pushing and pulling implements and more particularly to jacks for use in connection with automobiles.

One of the primary objects of the present invention is to provide an improved jack which is adapted to be rigidly connected with the wheels of an automobile so that when the vehicle is started in reverse or forward, as the case may be, the vehicle will be lifted upon the jack, thereby dispensing with the necessity of lifting the vehicle by hand.

Another salient object of the invention is to provide a vehicle jack which can be readily applied to the front or rear wheels of the vehicle from the side thereof, whereby the necessity of getting under the vehicle to set the jack in position and to operate the same is eliminated.

A further object of the invention is the provision of an improved jack which is adapted to be clamped directly to the wheels of the vehicle, the jack having a ground engaging base extending radially beyond the wheel, so that upon backing or forward movement of the vehicle under its own power the base will engage the ground and lift the wheel carrying the jack clear of the ground.

A further object of the invention is the provision of a novel clamp for engaging the axle and spokes of a wheel, the clamp acting to firmly bind the jack in place with a minimum amount of work and effort.

A further object of the invention is the provision of novel means for releasing the clamp from the wheel after the vehicle has been raised so that the vehicle will be supported by the jack solely on the axle, and thus allow the removal of the wheel if desirable.

A further object of the invention is to provide a novel jack which is adapted to be operated by the vehicle riding upon the jack, having novel adjusting means whereby the jack can be initially adjusted relative to the size of the wheels with which it is to be used.

A further object of the invention is the provision of novel means for operating the clamping jaws, whereby the jaws can be readily adjusted to their clamping position in engagement with the spokes of the wheel.

A further object of the invention is the provision of a novel handle for engaging the operating means so as to increase the leverage thereon whereby the said operating means can be readily manipulated.

A still further object of the invention is to provide an improved automobile jack of the above character which is durable and efficient in use, one that is simple and easy to manufacture and one which can be placed upon the market at a reasonable cost.

With these and other objects in view the invention consists in the novel construction, arrangement and formation of parts, as will be hereinafter more specifically described, claimed, and illustrated in the accompanying drawings, in which:

Figure 1 is a side elevation of the jack showing the same clamped to the rear wheel of an automobile and illustrating the position of the jack prior to the backing of the automobile and the lifting thereof, Figure 2 is an end elevation of the jack showing the same removed from the automobile, Figure 3 is a top plan view of the improved jack.

Figure 4 is a vertical section through the jack taken on the line 4—4 of Figure 3 looking in the direction of the arrows illustrating the novel adjusting means for the clamping jaws of the jack.

Figure 5 is a detail vertical section taken on the line 5—5 of Figure 4, looking in the directon of the arrows and illustrating the formation of the hand wheel of the adjusting mechanism, Figure 6 is a view similar to Figure 1 showing the vehicle in its raised position after the backing thereof on the jack, Figure 7 is a front elevation of the jack, Figure 8 is a rear elevation of the jack, showing the position of the axle standard in dotted lines for preventing movement of the jack when the vehicle is backed thereon, Figure 9 is a detail section through one of the clamping jaws taken on the line 9—9 of Figure 3, Referring to the drawings in detail, wherein similar reference characters designate corresponding parts throughout the several views, the letter A generally indicates the improved jack and B an automobile with which the same can be used.

The automobile B can be of any preferred character or make and has been shown to illustrate the use of the improved jack. As shown the automobile includes a body 10 having a rear axle 11 and rear wheel 12 on which is mounted a tire 13. The wheel 12 can be of any desired type and includes the hub 14, spokes 15 and felly 16.

The improved jack A comprises a base casting 20 and an axle engaging standard 40.

The base casting or stand 20 can be formed of any desired material possessing the necessary tensile strength and includes an open base or foot plate 21. This foot or base plate 21 is formed relatively large so as to form a firm support for the jack and is preferably of a rectangular shape having its center open as at 22, which forms means for gripping the ground so as to prevent slipping of the jack.

The foot or base frame 21 has formed thereon or connected thereto the upright plate or standard 23 which can be braced by arms 24 and 25 if desired. The upper end of the standard or plate 23 has formed therewith the laterally projecting horizontally disposed spaced ears 26. These ears 26 overlie the base plate or foot 21 and form means for supporting the arms 27 and 28 which are pivoted thereto, as at 29. The arms 27 and 28 are adapted to swing toward and away from one another and have their outer ends bent outwardly and provided with the oppositely directed clamps or jaws 30 for gripping contact with the spokes of a wheel, as will be later described. These clamps or jaws 30 are disposed at an angle to one another and to the standard 23 so that the same will conform to the position of the spokes of a wheel. If preferred one of the arms 27 or 28 can be formed rigid with the ears 26 and thus allow only one of said arms to move relative to the standards. Each of the jaws or clamps 30 receives a removable pad 31 which can be formed of any cushioning material such as rubber or leather, so as to prevent injury to the paint of the wheel when the jack is clamped thereto.

Various means can be provided for adjusting the jaws into and out of clamping relation with the spokes of a wheel but as shown I prefer to provide the clamping means 32. This clamping means 32 includes a post 33 rigidly secured to the outer face of the jaw 30 carried by the arm 27. This post 33 has pivotally connected thereto a swinging rod 34 which is threaded throughout its length. An adjusting screw 35 is threaded on the rod and is provided with a hand wheel 36 for permitting rotation of said nut. The jaw 30 of the arm 28 has formed thereon a bifurcated arm 37 through which is adapted to pass the rod 34. The outer end of the nut 35 is rounded and is adapted to fit within a substantially hemispherical socket formed in the arm 37. It can be seen that when the rod is disposed in the slot of the bifurcated arm 37 and the nut is threaded outward on the rod 34 that the jaws 30 will be adjusted away from one another.

In case that additional leverage is desired for turning the nut 35 a handle 38 is provided which is rotatably and slidably mounted on the nut. This handle carries a rigid pin 39 which is adapted to fit in any one of a plurality of recesses 36' formed in the periphery of the hand wheel 36. In order to hold the handle on the nut a retaining collar 35' can be secured to the nut 35 in spaced relation to the hand wheel 36. The handle is confined between the hand wheel and the collar and it is obvious that by sliding the handle on the nut that the pin can engage in any one of the notches 36', which will lock the handle on the nut.

The axle standard 40 for use in conjunction with the base casting 20 comprises a flat slotted arm 41 having an arcuate seat 42 formed on the upper end thereof for engaging the axle. The inner face of the flat slotted arm 41 is provided with a rack 43, which may be provided with any preferred number of rack teeth. The outer face of the standard 23 of the base casting 20 is likewise provided with any preferred number of rack teeth 44 which are adapted to mesh with the rack teeth of the rack 43. The standard 23 adjacent to the opposite ends thereof is provided with internally threaded bolt openings 45 and 46 into either one of which is adapted to be threaded a hand screw 47 which extends through the slot of the arm 41. When the standard 40 is to be adjusted on the standard 23 the screw is placed in the uppermost opening 45 and the standard 40 is moved outward on the bolt so as to disengage the rack teeth and the standard is then raised or lowered to a desired position after which the screw is tightened for bringing the teeth into meshing engagement and holding the standards against movement.

In the use of the improved jack, the same is placed on the inside of the wheel with the jaws 30 engaging a pair of the spokes and the base frame 21 extending laterally under the tire as clearly shown in Figure 1. The nut 35 is now turned so as to force the jaw 30 in opposite direction into firm contact with the spoke 15 of the wheel. The jack will now be firmly connected with the wheel and by backing the vehicle slightly the base frame 21 of the jack will come into engagement with the ground and the vehicle will be lifted on the jack. The vehicle tire can now be readily removed from the wheel 7 and any other necessary or desirable repairs can be made. When it is desired to lower the vehicle it is merely necessary to again start the same forwardly or rearwardly, or the vehicle may simply be given a push so as to move the same off of the jack. The nut is now turned in the opposite direction so as to release the jaws and the jack can now be readily removed from the wheel.

In case it is desired to remove the wheel from the vehicle the standard 40 can be used and it can be seen that after the same is placed in position with the seat 42 in engagement with the axle that the jaws can be swung from out of engagement with the spokes, which will allow the quick releasing of the wheel and the jack will support the vehicle solely in the axle.

When the vehicle is being supported from the wheel the standard 40 can be used as an additional base for the jack so as to prevent movement of the jack or slipping thereof on the ground. In this instance the screw is removed from the opening 45 and placed through the slot in the standard 40 and inserted in the lower opening 46 after which the standard is swung down at right angles so that one edge thereof will be flush with the lower surface of the base for engagement with the ground. As shown the rear face of the base casting is provided with vertical ribs 50 on each side of the standard 23 and either one of these ribs is adapted to fit between the rack teeth 43 of the standard 40 when the same is in its extended position. This prevents shifting movement of the standard 43 across the standard 23.

While in the drawings I have only shown the jack applied to the rear wheel of an automobile, but it is to be understood that the same can be effectively applied to the front wheel.

Changes in details may be made without departing from the spirit or scope of this invention, but:

What I claim as new is:

1. A jack comprising a ground engaging foot, a standard, clamps carried by the standard for engaging the wheel, and an independent axle engaging arm associated with the standard.

2. A vehicle jack comprising a foot, a standard on the foot, arms pivotally secured to the standard, spoke engaging jaws formed on the arms, and an adjustable member engaging the jaws for moving the jaws into clamping engagement with the spokes of a wheel.

3. A vehicle jack comprising a foot, a standard on the foot, laterally projecting arms pivoted to the standard, wheel spoke clamping jaws carried by the arms disposed at an angle to one another and to the standard, and adjustable means for moving the jaws relative to one another.

4. A vehicle jack comprising a foot, a standard on the foot, a pair of arms carried by the standards one of which is movable relative to the other, angularly disposed wheel spoke clamping jaws on said arms, a threaded rod pivotally secured to one of the jaws, a bifurcated leg carried by the other jaw for receiving the rod, and a nut threaded on the rod for engaging said bifurcated leg.

5. A vehicle jack comprising a foot, a standard on the foot, a pair of arms carried by the standards one of which is movable relative to the other, angularly disposed wheel spoke clamping jaws on said arms, a threaded rod pivotally secured to one of the jaws, a bifurcated leg carried by the other jaw for receiving the rod, a nut threaded on the rod for engaging said bifurcated leg, said nut having a hand wheel provided with peripheral notches, and a hand lever slidably and rotatably mounted upon the nut having a rigid pin adapted to engage in any one of the notches in the nut whereby upon movement of the handle the nut is turned therewith.

6. A vehicle jack comprising a ground engaging foot, a standard on the foot, wheel spoke clamping means carried by the standard, and an adjustable axle engaging standard adjustably associated with the first mentioned standard.

7. A vehicle jack comprising a ground engaging foot, a standard on the foot, wheel clamping means carried by the standard, rack teeth formed on the outer face of the standard, a slotted axle engaging standard, a rack on the inner face of the axle engaging standard for engaging the first mentioned rack, and a screw carried by the first mentioned standard and disposed in said slot of the axle engaging standard having a head for impinging against said axle engaging standard.

8. A vehicle jack comprising a ground engaging foot, a standard on the foot, a wheel engaging clamp carried by the standard, and an adjustable axle engaging standard slidably and pivotally carried by the first mentioned standard for movement above the first mentioned standard or laterally thereof with one edge flush with the lower surface of the foot.

9. A vehicle jack comprising a standard having axle and ground engaging ends, and adapted to be initially positioned between the axle and the ground in a plane laterally beyond the felly and spokes of the wheel and at an inclination to the vertical, and means extending from the standard to the wheel and adapted to connect the standard to the wheel to permit the standard to be moved through the medium of the wheel into an upright or load sustaining position.

10. A vehicle jack comprising a standard embodying a ground engaging member and an axle engaging member, means carried by one of said members for securing the standard to a wheel, and means independent of said first means for securing the members together for relative adjustment so as to permit the height of the standard to be varied.

In testimony whereof I affix my signature.

THOMAS R. BRUMFIELD.